United States Patent Office 3,158,660  
Patented Nov. 24, 1964

3,158,660  
PRODUCTION OF CYCLOHEXADIENE  
Lawrence J. Hughes, Hitchcock, Tex., assignor to Monsanto Company, a corporation of Delaware  
No Drawing. Filed July 21, 1960, Ser. No. 44,275  
2 Claims. (Cl. 260—666)

The present invention relates to a process for producing cyclohexadiene, and more particularly to a method for producing cyclohexadiene from allyl chloride.

Cyclohexadiene is a potentially valuable hydrocarbon in the synthesis of rubber, plastics, and resins because of its conjugated unsaturation. This chemical structure permits its use in polymerization and condensation reactions leading to the formation of the long chain molecules characteristic of these types of products. Up to the present time, however, cyclohexadiene has been available only by a long chemical synthesis and, hence, has not been widely used. It is, therefore, an object of the present invention to provide a simple and relatively inexpensive method for producing this cycloalkadiene. Other objects and advantages of the invention will become apparent from the following description thereof.

According to the invention, cyclohexadiene is produced by thermally cracking allyl chloride at a temperature within the range from about 600° C. to about 630° C. By the use of proper reaction times and a large surface to volume ratio, tars and carbonaceous deposits ordinarily produced are substantially decreased and unexpectedly good yields of cyclohexadiene are obtained.

The following example illustrates the invention but is not intended to limit its scope in any manner whatsoever.

*Example 1*

The reactor employed was a 22-mm. I.D. quartz tube 23 inches long fitted with a 6 mm. O.D. thermowell and filled with 8–12 mesh porous silicon carbide. It was wrapped with Nichrome ribbon and covered with high-temperature pipe insulation.

The reactor was heated to the desired temperature while a stream of dry nitrogen was passed through it. When the temperature had become stabilized, the allyl chloride feed mixture was passed through the tube. This feed had been prepared by passing nitrogen through a rotameter to an allyl chloride reservoir which was immersed in a constant temperature bath set at 27° C. The nitrogen was saturated with allyl chloride vapor by passing the gas through a sintered glass tip below the liquid surface. The gaseous mixture containing 400 mm. partial pressure of allyl chloride was then passed through a short preheater maintained at 150° C. before being introduced into the pyrolysis tube.

The effluent gas was conducted through a cold water condenser, a water scrubber, a Dry Ice trap, and a liquid nitrogen trap. The contents of the traps and any organic phase from the water scrubber were combined, weighed and analyzed by means of a gas-liquid partition chromatograph. The solution from the water scrubber was diluted to a standard volume and an aliquot thereof was titrated from HCl content.

Results of several runs conducted under different conditions in this manner are tabulated below.

| Temp. (° C.) | Contact Time (Sec.) | Conversion (Percent) | Yield of Cyclohexadiene (Percent Based on Allyl Chloride) |
|---|---|---|---|
| 470–50 | 1.04 | 15 | 5.5 |
| 500–580 | 1.00 | 8.9 | 7.1 |
| 530–610 | 0.97 | 17.0 | 18.5 |
| 660 | 0.94 | 27.4 | 21.8 |
| 660–670 | 0.90 | 47.2 | 4.1 |

It is apparent from the foregoing data that while small amounts of cyclohexadiene may be formed at temperatures below 600° C. and above 630° C., the formation of this conjugated diene occurs primarily within the narrow temperature range from 600° C. to 630° C. and that the temperature at which pyrolysis of allyl chloride is effected is critical with respect to the production of cyclohexadiene.

Variations in procedure and reaction conditions from those given in the example may be made without departing from the scope of the invention. For example, the pyrolysis may be carried out in a tubular reactor of porcelain, silica or any other refractory non-catalytic material capable of withstanding the temperatures employed as well as in the quartz reactor exemplified. Likewise, any type of inert finely divided material of high surface area can be used as packing in the reactor. Other materials in addition to the silicon carbide mentioned include quartz or porcelain chips, ground glass, and the like.

Reaction time or contact time, i.e., the time during which the allyl chloride is maintained in the pyrolysis zone at reaction temperature, varies from 0.5 second to about 4 seconds and preferably is from about 0.8 second to about 1.2 seconds.

The nitrogen used in the examples as an inert diluent in the feed is not required having been used merely for convenience as a carrier for the vaporized allyl chloride. No apparent advantages result from the use of an inert diluent and the allyl chloride can be fed as a vapor directly into the reactor.

The pressure employed is preferably atmospheric but operation at either superatmospheric or subatmospheric pressures is feasible.

Recovery of the cyclohexadiene is effected by low-temperature condensation of the gas mixture followed by fractional distillation of the liquid condensate in a conventional manner. Unreacted allyl chloride can be readily recovered by conventional means and recycled.

What is claimed is:

1. A process for the production of cyclohexadiene which comprises passing allyl chloride through a pyrolysis zone packed with an inert finely divided material of high surface area and heated to a temperature from about 600° C. to about 630° C. at a rate such that said allyl chloride is maintained at said temperature for from about 0.5 to about 4 seconds.

2. A process for the production of cyclohexadiene which comprises passing allyl chloride through a pyrolysis zone packed with silicon carbide and heated to a temperature from about 600° C. to about 630° C. at a rate such that said allyl chloride is maintained at said temperature for from about 0.8 to about 1.2 seconds.

References Cited in the file of this patent

UNITED STATES PATENTS 2,904,605   Schafer _____ Sept. 15, 1959

OTHER REFERENCES

Hurd et al.: J. Am. Chem. Soc., vol. 55, page 699, 1933.
A. E. Shilov: Doklady Akad. Nauk, SSSR, 98, 601–4 (1954), C.A., 49, 11605 (1955).
Porter et al.: "Journal of the American Chemical Society," volume 78, Number 21, pages 5571–5573, November 5, 1956.

UNITED STATES PATENT OFFICE
CERTIFICATE OF CORRECTION

Patent No. 3,158,660                          November 24, 1964

Lawrence J. Hughes

It is hereby certified that error appears in the above numbered patent requiring correction and that the said Letters Patent should read as corrected below.

Column 1, in the table, first column, lines 1 to 5 thereof should appear as shown below instead of as in the patent:

540-50
570-580
600-610
630
660-670

Signed and sealed this 13th day of July 1965.

(SEAL)
Attest:

ERNEST W. SWIDER
Attesting Officer

EDWARD J. BRENNER
Commissioner of Patents